United States Patent [19]

Reilich

[11] Patent Number: 4,804,985
[45] Date of Patent: Feb. 14, 1989

[54] POLARITY INSENSITIVE ELECTRONIC FLASH DRIVER CIRCUIT

[75] Inventor: James A. Reilich, Hilton, N.Y.

[73] Assignee: Eastman Kodak Company, Rochester, N.Y.

[21] Appl. No.: 148,246

[22] Filed: Jan. 25, 1988

[51] Int. Cl.$^4$ .............................................. G03B 15/03
[52] U.S. Cl. .................................. 354/145.1; 354/413
[58] Field of Search ..................... 354/145.1, 290, 148, 354/413; 307/236, 248, 284, 305, 127

[56] References Cited

U.S. PATENT DOCUMENTS

| 3,134,048 | 5/1964 | Wolfframm et al. | 315/206 |
| 3,524,102 | 4/1970 | Michalski et al. | 315/238 |
| 3,657,598 | 4/1972 | Nomura et al. | 315/100 T |
| 4,095,245 | 6/1978 | Kuraishi | 354/145 X |
| 4,130,767 | 12/1978 | Okuhara | 307/305 |

Primary Examiner—E. T. Hix
Assistant Examiner—David M. Gray
Attorney, Agent, or Firm—James A. Smith

[57] ABSTRACT

A polarity insensitive flash driver circuit for use in a photographic system including a camera for generating a flash trigger signal, and an electronic flash unit having a trigger circuit actuatable responsive to the flash trigger signal to initiate a flash illumination. This flash driver circuit includes a two conductor, polarity insensitive connector for connection to the flash driver circuit. A first gate controlled rectifier is connected between the two conductors for controllably conducting a current in a first polarity. A second gate controlled rectifier is connected between the two conductors for controllably conducting a current in a second polarity. Actuating means responsive to the flash trigger signal simultaneously actuate the first and second gate controlled rectifiers to conduct a current.

4 Claims, 1 Drawing Sheet

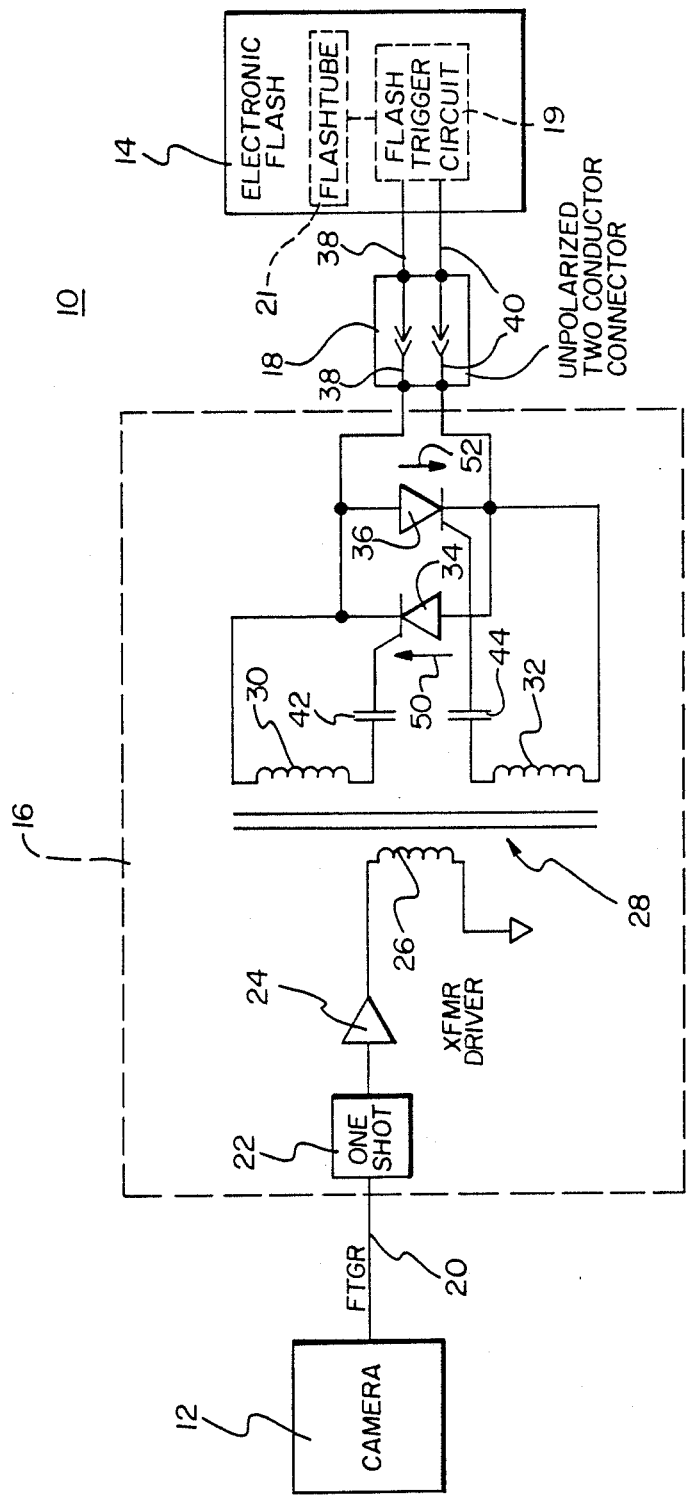

4,804,985

POLARITY INSENSITIVE ELECTRONIC FLASH DRIVER CIRCUIT

FIELD OF THE INVENTION

The present invention relates generally to photographic systems and more specifically to a polarity insensitive, flash driving circuit for use with an electronic flash.

BACKGROUND OF THE INVENTION

In a typical professional photographic system, one or more electronic flash or strobe type lights are synchronized with the operation of a camera to illuminate a photographic subject. Pursuant to the activation of the camera shutter, the camera generates a flash trigger pulse. This flash trigger pulse is used to actuate a flash driver circuit, which in turn activates a flash trigger circuit within the electronic flash. The flash trigger circuit provides a current to drive a flash tube, thereby causing the flash tube to emit the desired illumination. The flash trigger circuit is actuated by an electrical short-circuit provided within the flash driver circuit, this short circuit permitting the flash tube activating current to flow.

A problem often encountered in the operation of the above described photographic system is the non firing of the flash due to the polarity sensitivity of the flash driver circuit. More specifically, because the electrical short circuit provided by the flash driver circuit is typically created through a controllable semiconductor device, the flash driver circuit to electronic flash connection exhibits a polarity. If the flash trigger circuit is connected to the flash driver circuit (i.e. across the semiconductor device) in the wrong polarity, the semiconductor device acts as an open circuit, blocking the desired flow of current and the firing of the flash tube.

In typical photographic studios employing such photographic systems, polarized plugs supplied with the electronic flashes are often replaced with studio-compatible, non-polarized plugs. The use of these non-polarized plugs increases the convenience of connecting the various electronic flashes and cameras together, but exacerbates the above described, polarity sensitivity problem. The resultant non firing of the flash causes many pictures to be lost.

SUMMARY OF THE INVENTION

Accordingly, the principal object of the present invention is to provide a new and improved flash driver circuit for a photographic system which permits a camera to be connected to a flash in a polarity insensitive manner.

Another object of the invention is to provide a flash driver circuit, for use with an electronic flash having a trigger circuit actuated by a short-circuit current path, which provides such a current path in both directions of a two-conductor connection.

In accordance with the present invention, a new and improved flash driver circuit is provided for use with a photographic system, the photographic system including a camera for generating a flash trigger signal, and an electronic flash unit having a trigger circuit actuatable responsive to the flash trigger signal to initiate a flash illumination. The flash driver circuit comprises a two conductor, polarity insensitive connector for connection to the flash trigger circuit. A first conducting means is connected between the two conductors for controllably conducting a current in a first polarity. A second conducting means is connected between the two conductors for controllably conducting a current in a second polarity. Actuating means responsive to the flash trigger signal are provided for simultaneously actuating the first and second conducting means to conduct a current.

BRIEF DESCRIPTION OF THE DRAWING

While the specification concludes with claims defining the features of the invention that are regarded as novel, it is believed that the invention, together with further objects thereof, will be better understood from a consideration of the following description in conjunction with the drawing figure, in which:

The FIGURE is a diagrammatic illustration of a photographic system constructed in accordance with the present invention.

DETAILED DESCRIPTION OF THE INVENTION

Referring now to the sole FIGURE, a photographic system 10 constructed in accordance with the present invention includes a camera 12 and an electronic flash 14. A flash driver circuit 16 is connected between camera 10 and flash 14, the circuit being connected to the flash by an unpolarized, two conductor connector 18. Flash 14 comprises a conventional electronic flash, including a trigger circuit 19 responsive to an electronic short circuit for conducting a current to trigger a flash tube 21. This triggering of the flash tube provides a flash illumination. Such an electronic flash is shown, for example, in U.S. Pat. No. 4,095,245 to Kurashi, incorporated herein by reference. Camera 12 comprises a conventional photographic camera capable of generating a "FLASH TRIGGER" (FTGR) signal on a signal line 20 to initiate the above described flash illumination.

Referring now to flash driver circuit 16, a 100 microsecond one-shot generator 22 is connected seriatim between signal line 20 and the input of a transformer driver 24. The output of transformer driver 24 is connected to the primary winding 26 of an isolation pulse transformer 28. Transformer 28 further includes two secondary windings, indicated at 30, 32.

A pair of silicon controlled rectifiers (SCRs), indicated at 34, 36, are connected in opposite polarities between the two conductors in connector 18. For purposes of explanation, these two conductors are indicated at 38, 40. SCR 34 has its anode connected to conductor 40, and its cathode connected to conductor 38. SCR 36 is connected in an opposite polarity, having its anode connected to conductor 38 and its cathode connected to conductor 40.

Continuing to describe flash driver circuit 16, a first end of transformer secondary winding 30 is connected serially through a dc blocking capacitor 42 to the gate of SCR 34. The opposite end of winding 30 is connected to conductor 38. A first end of transformer secondary winding 32 is connected serially through a second dc blocking capacitor 44 to the gate of SCR 36. The opposite end of winding 32 is connected to conductor 40.

In operation, when a logical high FTGR signal is generated by camera 12 on signal line 20, it is received by one shot 22 and converted to a 100 microsecond pulse. This pulse is received by transformer driver 24, which responsively energizes primary 26 of isolation pulse transformer 28. Responsive to the energization of primary transformer winding 26, secondary transformer windings 30, 32 are energized. Secondary transformer winding 30 applies a current pulse to the gate of SCR 34, activating the SCR to conduct current in a first polarity as indicated by arrow 50. Simultaneously, secondary transformer winding 32 applies a current pulse to the gate of SCR 36, activating the SCR to conduct current in a second polarity as indicated by arrow 52.

There is thus provided a flash driver circuit for use in a photographic system which permits an electronic flash to be connected to a camera in a polarity insensitive manner. This permits a wide variety of connectors to be used, and accommodates for what might otherwise be mistakes in the polarity of the connection, such mistakes preventing the flash from firing, and possibly injuring equipment.

While a preferred embodiment of the invention has been illustrated and described, it will be clear that the invention is not so limited. Numerous modifications, changes, variations, substitutions, and equivalents will occur to those skilled in the art without departing from the spirit and scope of the present invention.

What is claimed is:

1. In a photographic system including a camera for generating a flash trigger signal, and an electronic flash unit having a trigger circuit actuatable responsive to said flash trigger signal to initiate a flash illumination, a flash driver circuit comprising:
   a two conductor, polarity insensitive connector for connection to said flash trigger circuit;
   actuatable first conducting means connected between said two conductors for controllably conducting a current in a first polarity;
   actuatable second conducting means connected between said two conductors for controllably conducting a current in a second polarity; and
   actuating means responsive to said flash trigger signal for simultaneously actuating said first and second conducting means to conduct a current.

2. Apparatus in accordance with claim 1 wherein said first and second conducting means each comprises a silicon controlled rectifier, said silicon controlled rectifiers being connected in opposite polarities between said two conductors.

3. Apparatus in accordance with claim 1 wherein said actuating means comprises a pulse transformer having a primary winding connected to sense said flash trigger signal, and two secondary windings, each of said secondary windings connected to actuate one of said first or second conducting means.

4. Apparatus in accordance with claim 1 wherein:
   said first and second conducting means each comprises a silicon controlled rectifier, said silicon controlled rectifiers being connected in opposite polarities between said two conductors, each of said silicon controlled rectifiers including a gate connection responsive to a current pulse for initiating conductance of a current; and
   said actuating means comprises a pulse transformer having a primary winding connected to sense said flash trigger signal, and two secondary windings, each of said secondary windings connected to a gate of a respective one of said silicon controlled rectifiers for applying a triggering current pulse thereto in response to the sensing of said flash trigger signal.

* * * * *